(12) United States Patent
Wang

(10) Patent No.: US 8,255,223 B2
(45) Date of Patent: Aug. 28, 2012

(54) USER AUTHENTICATION BY COMBINING SPEAKER VERIFICATION AND REVERSE TURING TEST

(75) Inventor: Kuansan Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1205 days.

(21) Appl. No.: 11/004,548

(22) Filed: Dec. 3, 2004

(65) Prior Publication Data

US 2006/0136219 A1 Jun. 22, 2006

(51) Int. Cl.
*G06F 17/27* (2006.01)
*G10L 17/00* (2006.01)
*G10L 21/00* (2006.01)

(52) U.S. Cl. ............ 704/275; 704/9; 704/246; 704/270; 704/270.1

(58) Field of Classification Search .......... 704/270–275, 704/9, 246
See application file for complete search history.

(56) References Cited

U.S. PATENT DOCUMENTS

| | | | |
|---|---|---|---|
| 5,774,525 A | 6/1998 | Kanevsky et al. | 379/88 |
| 6,671,672 B1 * | 12/2003 | Heck | 704/273 |
| 6,859,776 B1 * | 2/2005 | Cohen et al. | 704/270 |
| 6,895,438 B1 * | 5/2005 | Ulrich | 709/227 |
| 6,978,238 B2 * | 12/2005 | Wohlsen et al. | 704/246 |
| 7,395,436 B1 * | 7/2008 | Nemovicher | 713/193 |
| 2002/0107690 A1 * | 8/2002 | Souvignier | 704/251 |

FOREIGN PATENT DOCUMENTS

| | | |
|---|---|---|
| GB | 2 247 964 A | 3/1992 |
| JP | 02-024775 | 1/1990 |
| JP | 03-053369 | 3/1991 |
| JP | 11-088321 | 3/1999 |
| JP | 2001-306091 | 11/2001 |
| JP | 2002-108712 | 4/2002 |
| JP | 2002-312318 | 10/2002 |
| JP | 2002342281 A | 11/2002 |
| JP | 2003-099403 | 4/2003 |
| JP | 2003-132025 | 5/2003 |
| JP | 2004-306821 | 11/2004 |
| RU | 2267159 C2 | 12/2005 |
| WO | 03/073386 A2 | 9/2003 |
| WO | 03/094491 A1 | 11/2003 |
| WO | 03/107664 A1 | 12/2003 |
| WO | 2004099940 | 11/2004 |

OTHER PUBLICATIONS

Search Report for related European Patent Application Serial No. 05110853.8 dated May 4, 2006.
Ahn et al., L. "Telling Humans and Computers Apart (Automatically)", Communications of ACM, Feb. 2004.
Lopresti et al., D., "Human Interactive Proofs for Spoken Language Interfaces", in Proceedings Workshop on Human Interactive Proofs, Palo Alto, California, Jan. 2002.
Official Communication (Exam Report) dated Jan. 4, 2010, for Appln. No. 05 110 859.8-1245, 4 pgs.

(Continued)

*Primary Examiner* — Eric Yen
(74) *Attorney, Agent, or Firm* — Merchant & Gould

(57) ABSTRACT

Methods and system for authenticating a user are disclosed. The present invention includes accessing a collection of personal information related to the user. The present invention also includes performing an authentication operation that is based on the collection of personal information. The authentication operation incorporates at least one dynamic component and prompts the user to give an audible utterance. The audible utterance is compared to a stored voiceprint.

38 Claims, 6 Drawing Sheets

OTHER PUBLICATIONS

Russian Official Action, dated Jan. 12, 2010, for Appln. No. 2005133725.
Second Mexican Official Action (PA/a/2005/011799), filed Nov. 3, 2005.
Australian Office Action for Serial No. 2005222536, dated Feb. 22, 2010. 2 pages.
"Voice Filter Recognition," Huanxiang Lin, etc., Distance Education Journal, Aug. 31, 2004, Issue 4, p. 48-50.
First Office Action for Chinese patent application No. 200510118879.0, dated Jul. 24, 2009.
Australian Office Action, dated Oct. 13, 2009. 2 pgs.
Related Australian Official Action dated Jun. 3, 2010, Serial No. 2005222536, filed Oct. 12, 2005, 3 pgs.
Australian Office Action dated Sep. 22, 2010, for related Australian Appln. Serial No. 2005222536, filed Oct. 12, 2005, 2 pgs.
Second Chinese Official Action dated Sep. 6, 2010, for related Chinese Appln. Serial No. 200510118879.0, filed Nov. 3, 2005.
Third Mexican Official Action dated Dec. 22, 2010, for Mexican application Serial No. PA/a/2005/011799, filed Nov. 3, 2005.
Notice of Rejection in Japanese Application No. 2005-305797 mailed on Dec. 16, 2011.
Notice of Rejection in Australian Application No. 2005222536 mailed on Sep. 21, 2010.
Notice of Rejection in Chinese Application No. 200510118879.0 mailed on Dec. 31, 2010.
Notice of Rejection in Korean Patent Application No. 2005-0098470 mailed on Feb. 27, 2012.
Notice of Allowance in Russian Application No. 2005133725 mailed on Jun. 7, 2010.
Notice of Rejection in Japanese Application No. 2005-305797 mailed on Jul. 1, 2011.
Final Rejection mailed on Jun. 8, 2012 in co-pending Japanese Patent Application No. 2005-305797.
Official Communication (Exam Report) dated Jan. 4, 2010, EP Appln. No. 05110853.8, 4 pgs.
Russian Official Action, dated Jan. 12, 2010, for Appln. No. 2005133725, along with copy of best translation.

* cited by examiner

US 8,255,223 B2

USER AUTHENTICATION BY COMBINING SPEAKER VERIFICATION AND REVERSE TURING TEST

BACKGROUND OF THE INVENTION

The present invention generally pertains to systems and methods for user authentication. More specifically, the present invention is related to a machine-based system for authenticating a human user.

With the popularity of highly technological communication systems, providers of services have begun to provide automated programs for client access. For example, a client can access a banking account from various communication systems, such as telephone systems and network systems, to perform a variety of tasks. For example, the Internet can be accessed through cellular phones, personal data assistants (PDAs), desktops and kiosks. Such tasks include transferring money, depositing money, withdrawing money and accessing account balances. These service providers could potentially reveal valuable information about clients that is attractive to a hacker (a person who illegally gains access to secured information).

Attacks by hackers include using computer programs that attempt to exploit automated service programs designed to accommodate human users. In many instances, automated service programs are not configured to consistently differentiate between human access and machine access. Currently, many service providers rely on a client's knowledge of certain secrets. For example, such secrets can include PINs (personal identification numbers), passwords, social security numbers and information not readily known to the public, such as a user's mother's maiden name. However, not only can these secrets be easily forgotten by a client, their overuse can lead to easy discovery.

To heighten security, biometric-based approaches, such as fingerprint and voiceprint technologies, are becoming popular. For example, when a user accesses an automated service program over the telephone, the user is asked to supply a voice sample to a speech verification system to verify that the voice sample matches the voiceprint of the user they claim to be. However, biometric-based security samples can be copied or recorded for later use by a hacker. It is relatively easy to record a voice sample and replay the recording over the telephone. Speech verification systems are not always configured to differentiate between a live voice and a recording.

A Reverse Turing Test (RTT) has been utilized to determine whether a human or machine is requesting access to automated service programs. Such tests are based on the assumption that certain pattern recognition tasks are significantly harder for machines to perform than humans. For example, it is easier for a human to recognize patterns in distorted speech or a distorted image than a machine. A telephony application can, in one instance, play a noisy prompt that asks the user to spell a word and recite a digit sequence. A Web application can, in another instance, ask its user to type the alphanumeric string embedded in a distorted image. Problems with these types of solutions include issues arising from the fact that similar sounding words can have different spellings, many people are poor spellers, and it can be a challenge to commit a sequence of digits to memory. Also, over time, machines are likely to develop the capacity to hack these types of simple authentication tests.

In addition to protecting clients from unauthorized access to automated services, there is a need to heighten security to police interactions with personal computing devices and mobile devices. There is also a need to enhance the security associated with digital signature use when sending email. Currently, these technologies commonly require only a password or PIN input to access information. As discussed above, passwords and PINs are easily forgotten by a user and are easily discoverable by hackers. Those listed herein are only a few of many specific applications that will benefit from enhanced security.

SUMMARY OF THE INVENTION

Embodiments of the present invention pertain to a method for authenticating a user. The method includes accessing a collection of personal information related to the user. The method also includes performing an authentication operation that is based on the collection of personal information and incorporates at least one dynamic component. The authentication operation is configured to prompt the user to give an audible utterance. The audible utterance is compared to a stored voiceprint.

Embodiments of the present invention also pertain to a system that includes an information retriever configured to access a collection of personal information related to a user. The system also includes an authentication module configured to perform an authentication operation based on the collection of personal information. The authentication operation is configured to incorporate at least one dynamic component, and configured to prompt the user to give an audible utterance. A voice verification module processes the audible utterance to determine whether it at least substantially corresponds to a voiceprint of a user.

DETAILED DESCRIPTION OF ILLUSTRATIVE EMBODIMENTS

The present invention is described in the context of a machine-based system configured for communication with a human. Some machine-based systems, such as those that implement service programs, can be accessed by way of a communication system or network, such as the Internet, a cell phone network or a telephone network. For example, an automated service program, such as an automated customer service call center, can be accessed over a communication system by a client or customer. It should be noted, however, that machine-based systems can also or alternatively include personal computing devices, such as personal computers (PCs), or mobile computing devices, such as personal data assistants (PDAs) and cell phones, with which a user interacts to access or transmit secure information. Regardless of the type of machine-based system, the present invention is directed towards utilizing such a system to authenticate the identity of a user. Prior to describing the present invention in detail, embodiments of illustrative computing environments within which the present invention can be applied will be described.

Figure 1:
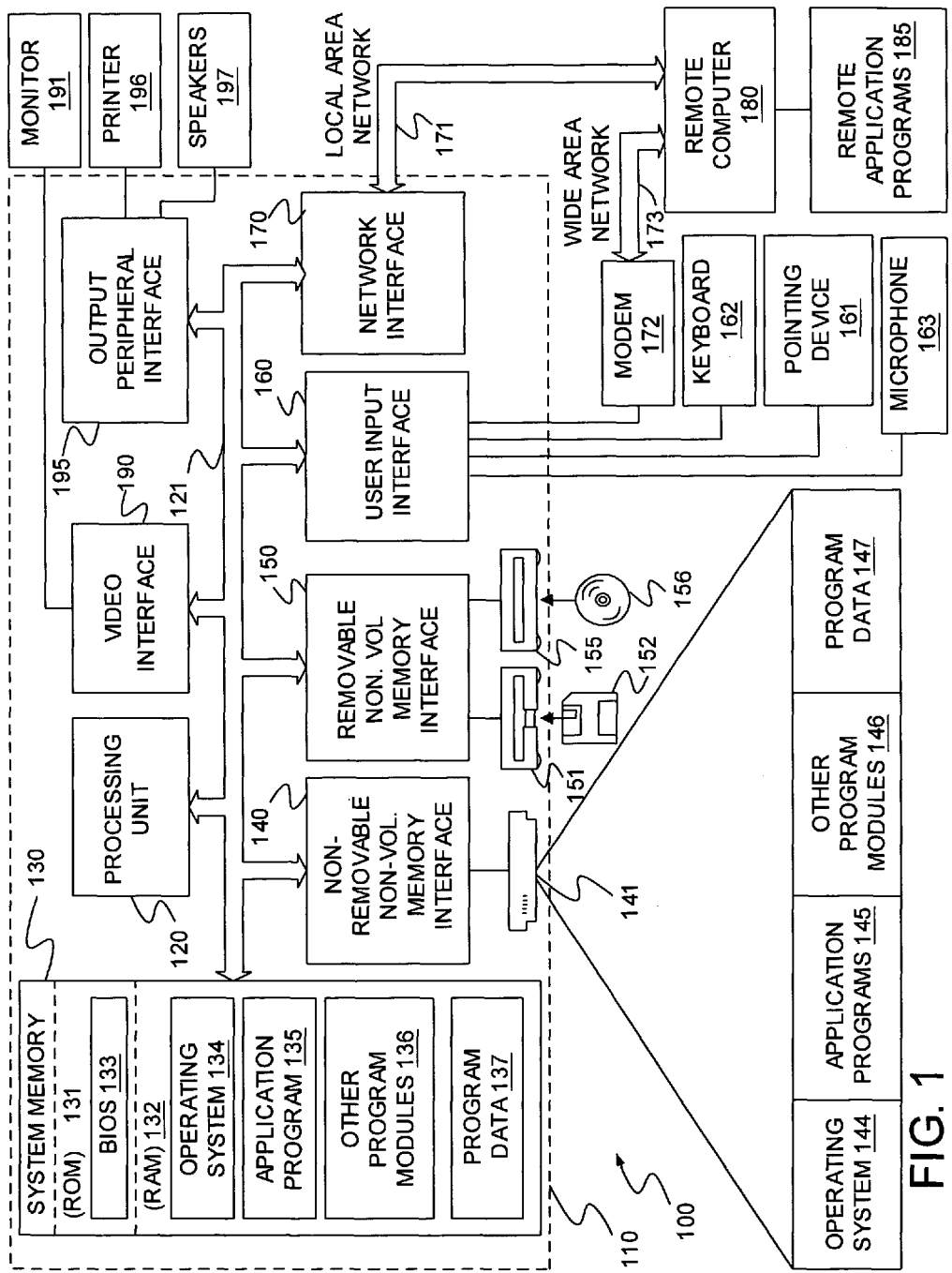
FIG. 1 illustrates a block diagram of a general computing environment in which the present invention can be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed primarily, but without limitation, to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
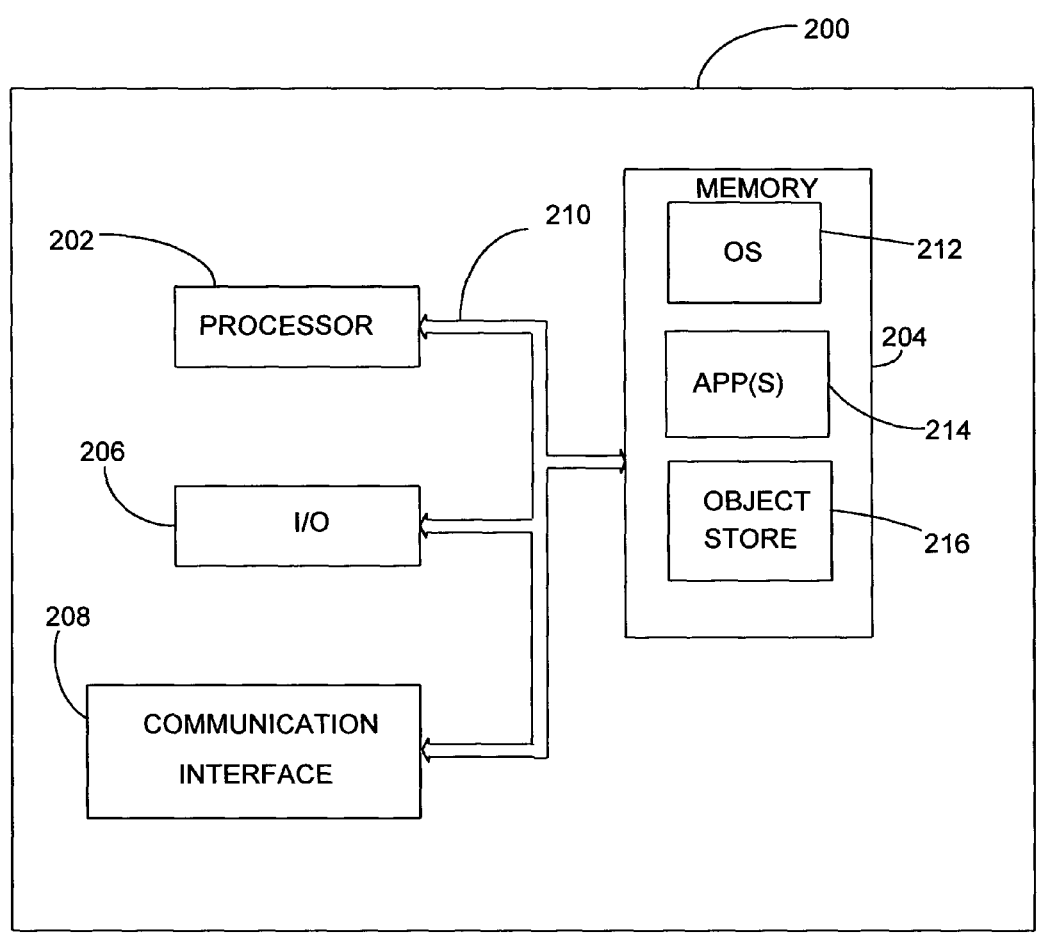
FIG. 2 illustrates a block diagram of a mobile device with which the present invention can be practiced.

FIG. 2 is a block diagram of a mobile device 200, which is another applicable computing environment. Mobile device 200 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
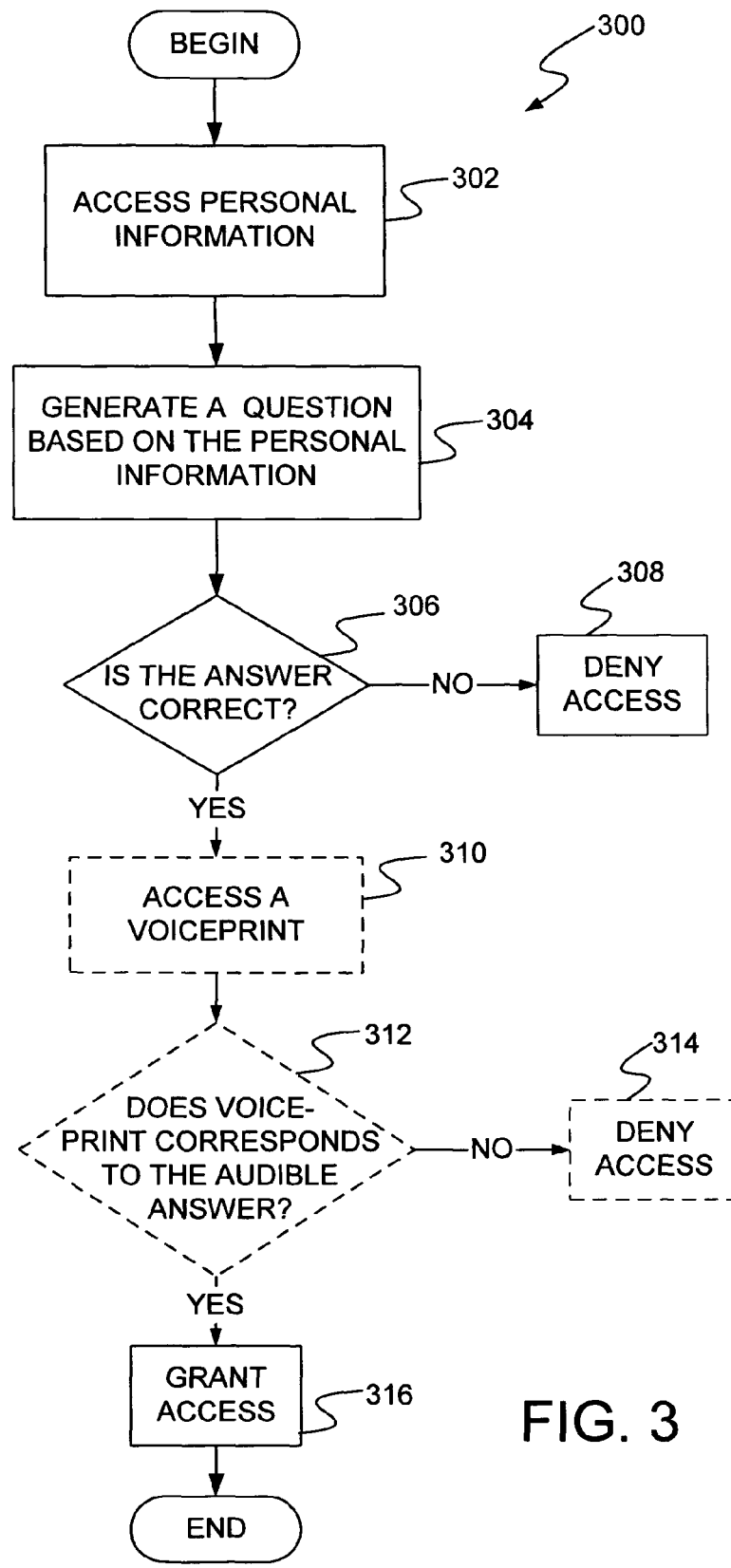
FIG. 3 is a flowchart that illustrates a method for authenticating a user.
Figure 4:
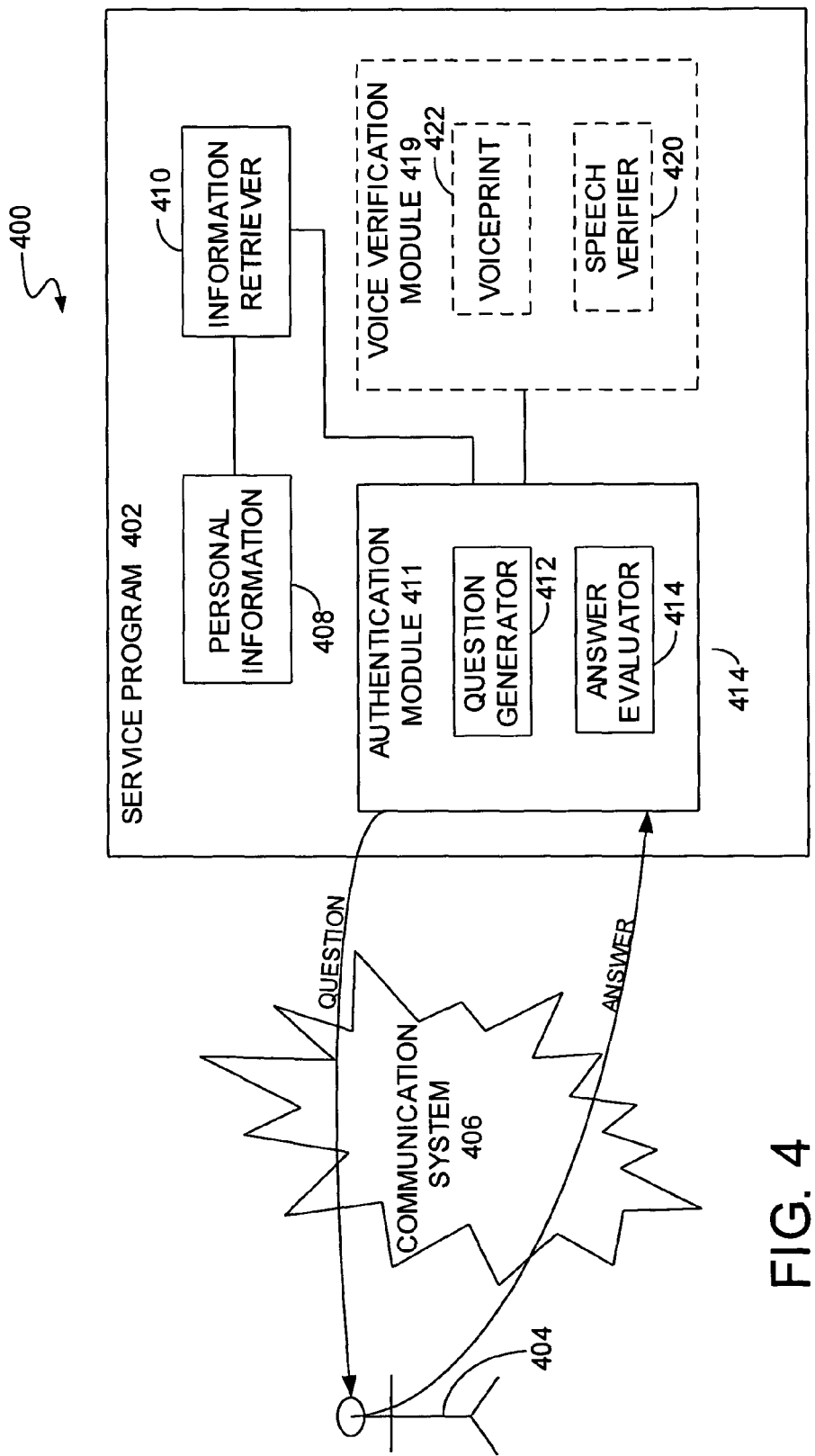
FIG. 4 illustrates a machine-based system for authenticating a user.
Figure 5:
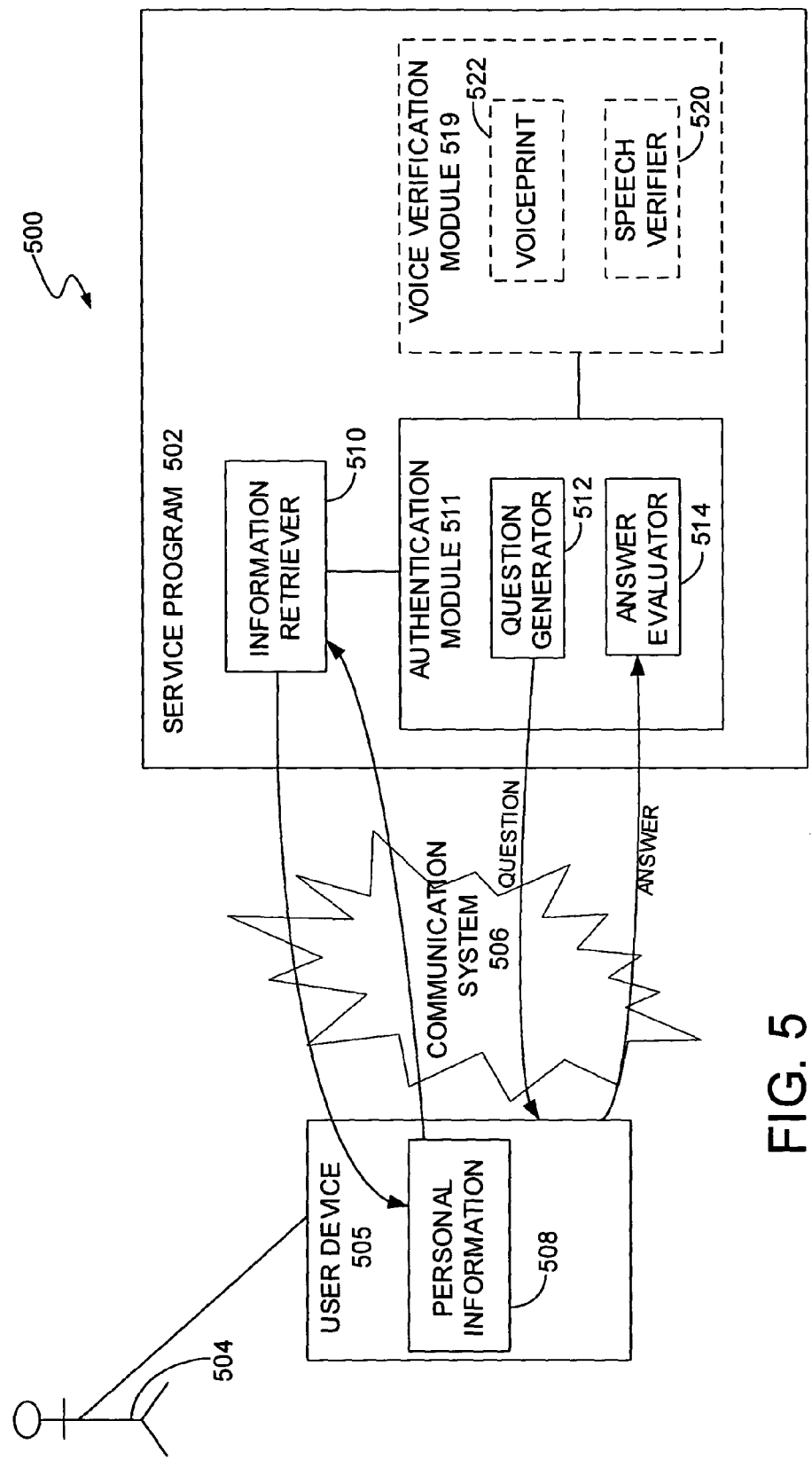
FIG. 5 illustrates a machine-based system for authenticating a user.
Figure 6:
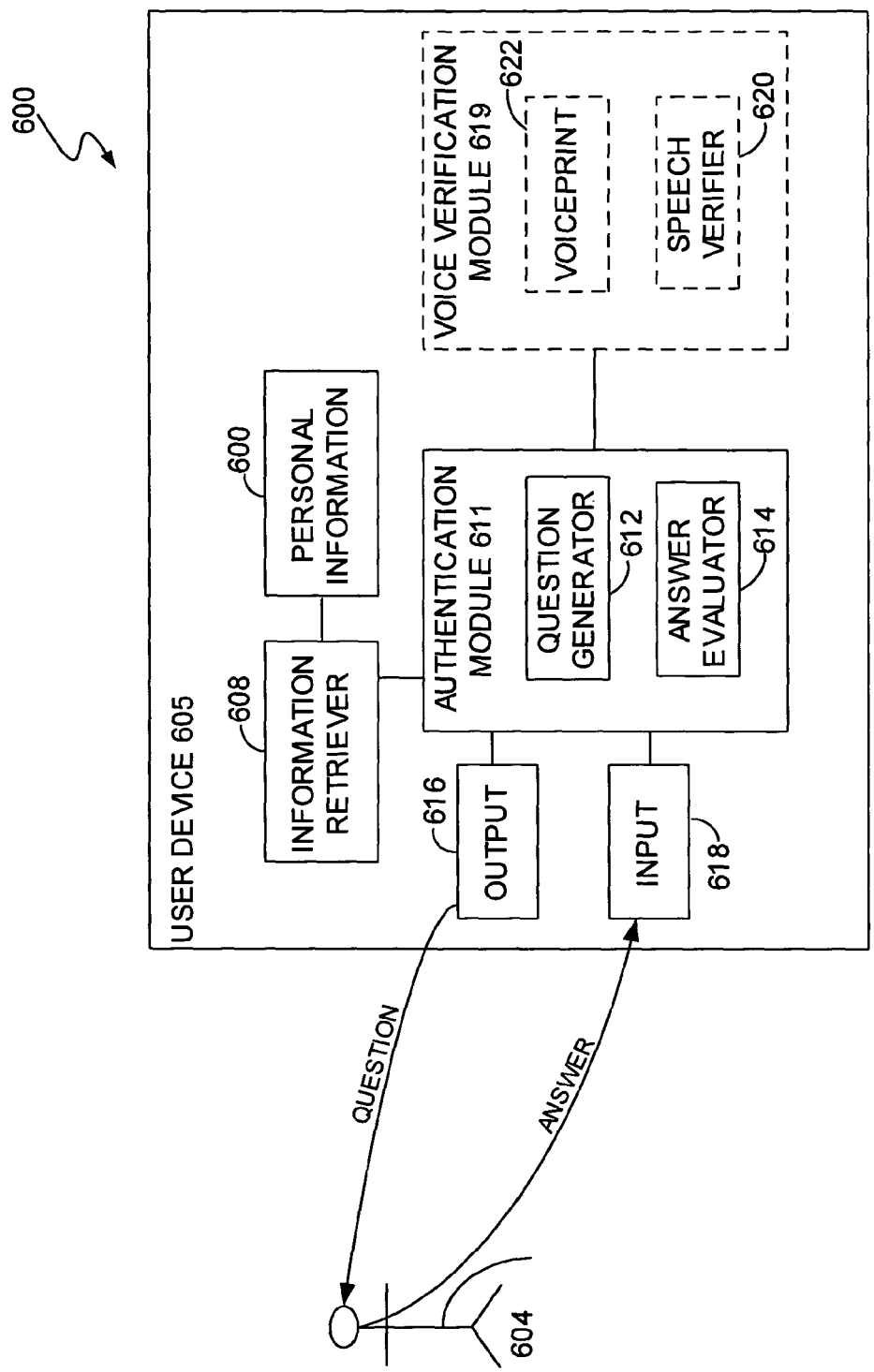
FIG. 6 illustrates a machine-based system for authenticating a user.

FIG. 3 is a flowchart 300 that illustrates a method for authenticating a user in accordance with system embodiments schematically illustrated in FIGS. 4-6. FIG. 4 illustrates a machine-based system 400 for authenticating a user 404 in accordance with an embodiment of the present invention. System 400 includes a service program 402 accessible by way of a communication system 406 by user 404. Communication system 406 can be, but is not limited to, a telephone network. FIG. 5 illustrates a machine-based system 500 for authenticating a user 504 in accordance with an embodiment of the present invention. System 500 includes a service program 502 accessible by way of a communication system 506 by user 505 via a user device 505. Communication system 506 can be, but is not limited to, a computer network, such as the Internet. User device 505 can be any type of computing device, such as a personal computing device, a mobile device (as illustrated FIG. 2) or a publicly located customer kiosk. FIG. 6 illustrates a machine-based system 600 for authenticating a user 604 in accordance with an embodiment of present invention. System 600 includes a user device 605 that user 604 can interact with to access or transmit secured data. User device 505 can be any type of computing device, such as a personal computing device, a mobile device or a publicly located customer kiosk.

In FIG. 4, service program 402 can be any type of service application accessible by way of a communication system that requires an authentication of user 404. By way of example, but not by limitation, service program 402 can be an automated banking call center where user or customer 404 can access account information and perform financial transactions. In this example, service program 402 is configured to authenticate a caller such that personal account information is only shared with an authenticated user that is qualified for such access. Other example service programs include automated credit card services, automated cellular phone services and automated airline services.

In FIG. 5, service program 502 can be any type of service application accessible over a communication system. In this case, user 504 interacts with service program 502 through a user device 505, wherein the interaction includes an authentication process to restrict access to program 502 to authorized users. By way of example, but not by limitation, service program 502 can be an internet banking service where a customer or user can access account information and make business transactions. In this example, service program 502 authenticates or logs in user 504 such that personal account information is only shared with an authenticated user that is qualified for such access. Other examples of network-based service programs include automated credit card services, automated cellular phone services and automated airline services.

In FIG. 6, user device 605 can be any type of computing device with which user 604 can interact. For example, user device 605 can be a personal computing device or a mobile device (as illustrated in FIG. 2). In this embodiment, user device 605 authenticates and verifies that user 604 is whom they claim to be. Authentication can be used for a variety of operations. For example, user device 605 can authenticate user 604 at log in. In another example, user device 605 can authenticate user 604 to access a digital signature when transmitting an email or transmitting data over a network. These are only a few examples that are within the scope of the present invention.

In accordance with one aspect of the present invention, the following is a description of an authentication process as illustrated in flowchart 300 (FIG. 3), and as implemented in the various system embodiments illustrated in FIGS. 4-6. At block 302, a collection of personal information is accessed.

With reference to the FIG. 4 embodiment, a collection of personal information 408 is stored in service program 402 and is accessed by information retriever 410. In one embodiment, personal information 408 includes information related to user 404 that is obtained during user enrollment for services provided by program 402. For example, personal information 408 can include a social security number, a birth date or any other type of information supplied by user 404. In another aspect, personal information 408 includes information obtained during service-oriented user interaction with program 402. For example, personal information 408 can include the user's prior transaction details, prior traveling specifics (in the case of an airline service program), or other types of transactional information that might change over time. In contrast to static information, such as a social security number or birth date, the time varying data manifests itself as better choices for authentication purposes as addressed in the present invention. Nevertheless, the present invention is applicable to either static or dynamic personal information.

With reference to the FIG. 5 embodiment, a collection of personal information 508 is stored in user device 505 and is accessed by information retriever 510 by way of communication system 506. Although FIG. 5 illustrates that personal information 508 is stored in user device 505, the present invention is not limited to such a configuration. Personal information 508 can be stored in service program 502 like the configuration shown in FIG. 4, or personal information 508 can be stored in both user device 505 and service program 502.

Information retriever 510 is configured to retrieve personal information that is stored on either user device 505 and/or service program 502. When personal information 508 is stored in service program 502, then personal information 508 can include information related to user 504 that is obtained during user enrollment for services provided by program 502 as discussed with reference to FIG. 4. When personal information is stored in service program 502, then personal information 508 can also or alternatively include information obtained during interaction with service program 502 as discussed with reference to FIG. 4.

When personal information 508 is stored in user device 505, then personal information 508 can include information related to interaction with user device 505. For example, personal information 508 can include information extracted from a user's contacts that are stored in a personal contacts application. In another example, information can be extracted from documents the user has created, sent or received. Still other examples include specific operations or tasks completed by the user on user device 505. This type of information can include the identity of whom the user last received an email from or sent an email to, or whom the user last received an instant message from or sent an instant message to. In addition, this type of information can include the last MP3 file downloaded or the last MP3 file burned to a disc. These examples of personal information can be easily extracted by an operating system and made available to an information retriever.

In one embodiment, data related to interaction with user device 505 is harvested or mined by annotating such data with semantic types. For example, some data is tagged as "numeral" type data, other data is tagged as "date" type data, still other data, such as contact names, is tagged as "string" type data. Information retriever 510 illustratively retrieves data based on these semantic types.

With reference to the FIG. 6 embodiment, a collection of personal information 608 is stored in user device 605 and is accessed by information retriever 610. In one embodiment, personal information 608 includes information related to user 604 that is obtained during user initiation of user device 605. For example, personal information 608 can include a social security number, a birth date or other types of information that is supplied by user 604. In another embodiment, personal information 608 also includes information obtained based on interaction with user device 605. For example, personal information 608 can include information extracted from documents the user has created, sent or received. Personal information 608 can include information extracted from a user's contacts that are stored in a personal contacts application. Such information can include the identity of whom the user last received an email from or sent an email to, or the identity of whom the user last received an instant message from or sent an instant message to. Such information can also include specific operations or tasks completed by the user on user device 605, such as the last MP3 file downloaded or the last MP3 file burned to a storage disc. This type of personal information can be easily extracted by an operating system and made available to the information retriever.

In one embodiment, the operating system harvests or mines data already stored on user device 605 by annotating such data with semantic types. For example, some data is tagged as "numeral" type data, other data is tagged as "date" type data, still other data, such as contact names, is tagged as "string" type data. In formation is then illustratively retrieved based on the annotations.

In FIG. 3, blocks 304 and 306 are directed towards performing an authentication operation. To incorporate aspects of the Reverse Turing Test (RTT) (i.e. synthesized challenges), the authentication operation performed in blocks 304 and 306 incorporates at least one dynamic component. In one embodiment, the authentication operation incorporates a dynamic component in the form of a dynamic question that asks about static information from the collection of personal information. The question is dynamic in that it requires a manipulation of the static information. For example, "what is the sum of the last three digits of your social security number?". The question need not be the same from one authentication attempt to the next. For example, "what is the sum of the first three digits of your social security number?".

In another embodiment, the authentication operation incorporates a dynamic component in the form of a static question that asks about continuously changing or dynamic information from the collection of personal information. The question is static in that it does not require manipulation of information, however, the question need not be the same from one authentication attempt to the next. For example, "who is the last person that you emailed?" or "what is the approximate balance of your checking account?".

At block 304, a question or authentication information is generated based on the collection of personal information. As discussed above, in one embodiment, the question incorporates a dynamic component. Although not specifically illustrated in FIG. 3, the question or authentication information is transmitted to the user.

In the system embodiment illustrated in FIG. 4, an authentication module 411 includes a question generator 412. In one embodiment, question generator 412 is configured to generate a dynamic question based on static information stored in personal information 408 and retrieved by information retriever 410. In one embodiment, question generator 412 is also or alternatively configured to generate a static question that asks about continuously changing or dynamic information from the collection of personal information 408. The question is presented through communication system 406 to user 404.

In one embodiment, question generator 412 generates a dynamic question prompting an operation or function to be performed or manipulated on static information. The operation can be an arithmetic operation related to numerical information, such as numerical data supplied by user 404 during enrollment, or an operation related to alphabetical information. Example questions include: "What is the sum of the last two digits of your social security number?", "What is the date exactly one week prior to your birthday in the month, date and year format?" or "What are the last three letters of your mother's maiden name in reverse order?". Question generator 412 illustratively changes the nature of the questions unpredictably or at random from one authentication attempt to the next. For example, question generator 412 will randomly choose to take the sum, difference or product of different types of numerals from one authentication attempt to the next.

As has been discussed, personal information 408 can also include information related to the specific interactions with service program 402. Therefore, in one embodiment, a static question asks about dynamic information. Examples include: "How many checking accounts do you have?", "What day was your last transaction?" or "When did you last travel with us?".

In the embodiment illustrated in FIG. 5, service program 502 includes an authentication module 511. Authentication module 511 includes a question generator 512. In one embodiment, question generator 512 is configured to generate a dynamic question based on static information stored in personal information 508 and retrieved by information retriever 510. In another embodiment, question generator 512 is configured to also or alternatively generate a static question based on dynamic information stored in personal information 508. The question is presented through communication system 506 to user device 505.

In accordance with another embodiment, question generator 512 is configured to generate a question based on either dynamic or static information that is retrieved from either user device 505 or service program 502. The nature of generated questions can be similar to any of those discussed in the context of the FIG. 4 embodiment. The scope of available questions is, however, broader in that it could include questions that pertain to interactions with the user device. For example, questions can relate to dynamic operations or information native to user device 505. Example questions include: "When was the last time you contacted John Doe?", "What did you do to a Stevie Wonder MP3 file last night?" or "Who did you instant message today?".

In the embodiment illustrated in FIG. 6, user device 605 includes an authorization module 611. Authorization module 611 includes a question generator 612. In one embodiment, question generator 612 is configured to generate a dynamic question based on static information stored in personal information 608 and retrieved by information retriever 610. In another embodiment, question generator 612 is also or alternatively configured to generate a static question based on dynamic information stored in personal information 608. The question is communicated to user 604 through output 616. Example outputs include, but are not limited to, a display or an audible speaker.

Personal information 608 can include information obtained during initiation of user device 605 or obtained during interactions with user device 605. Examples of the nature of potential questions include any of the question types discussed in relation to the system embodiments of FIGS. 4 and 5.

It should be noted that in the system embodiments schematically illustrated in FIGS. 4-6 the question generator 412, 512 and 612 do not necessarily generate the same questions every time service program 402, 502 and 602 authenticate a user. It is conceivable that question generator 412, 512 and 612 randomly generate different questions each time service program 402, 502 and 602 authenticate a user.

At block 306 (FIG. 3), the answer to the question received from the user is evaluated for correctness. If the answer is incorrect, then flowchart 300 passes to block 308 and the user is denied access. If however, the answer is correct, then flowchart 300 passes to a set of blocks (310, 312, 314) that are indicated with dashed lines. These blocks are steps that are optionally taken to further authenticate a user and will be described in detail below. It should be noted that these optional blocks require that the answer be received as an audible signal or utterance. Even if the answer is in the form of an audible signal, these blocks are still optional steps to further authenticate a user. When further authentication under the optional steps is not elected, then flowchart 300 passes to block 316 and access is granted.

In the embodiment illustrated in FIG. 4, authentication module 411 includes an answer evaluator 414. Answer evaluator 414 receives an answer to the question from user 404 by way of communication system 406. In FIG. 4, the answer is received by service program 402 in the form of an input signal. Example signals include, but are not limited to, an audible answer or a touch-tone input available on a telephone receiver. Answer evaluator 414 decodes the input signal and compares the answer to personal information 408 to determine if the answer is correct. If the answer is received in the form of an audible answer, then answer evaluator 414 illustratively is functionally engaged to an appropriate speech recognition system.

In the embodiment illustrated in FIG. 5, authorization module 511 includes an answer evaluator 514. Answer evaluator 514 receives an answer to the question from user device 505 by way of communication system 506. In FIG. 5, the answer received by answer evaluator 514 is in the form of an input signal. Example signals include, but are not limited to, a keypad input, a mouse selecting input or other type of selecting input that is configured to select a choice from a list of answers. In one embodiment, the answer can be transmitted as an audible answer. Answer evaluator 514 decodes the input signal and compares the answer to personal information 508 to determine if the answer is correct. If the answer is received in the form of an audible answer, then answer evaluator 514 illustratively is functionally engaged to an appropriate speech recognition system.

In the embodiment illustrated in FIG. 6, authorization module 611 includes an answer evaluator 614. Answer evaluator 614 receives an answer to the question from user 604 through input 618. In FIG. 6, the answer received by answer evaluator 614 through input 618 is in the form of an input signal. Example inputs include, but are not limited to, a keypad or a mouse. If input 618 is a mouse, then the answer can be selected from a choice of answers. In addition, the answer can be transmitted as an audible answer. Answer evaluator 614 decodes the input signal and compares the answer to personal information 608 to determine if the answer is correct. If the answer is an audible answer then answer evaluator 614 illustratively is functionally engaged to an appropriate speech recognition system.

The following is a description of the optional steps employed in FIG. 3 and system embodiments schematically illustrated in FIGS. 4-6 for electing to further authenticate a user. As previously noted, the answer evaluated in block 306 must be an audible answer to optionally elect to further authenticate a user. It should also be noted that any known speech recognition system such as those known for transcribing voice into text using a pronunciation dictionary can be implemented in support of step 306 when the answer is an audible answer.

If the audible answer is correct in block 306 and the audible signal is to be further authenticated, flowchart 300 proceeds to block 310. At block 310, the audible signal is analyzed and compared to the accessed voiceprint to verify that the user's voice signal at least substantially corresponds or matches the user's voiceprint. If the user's voiceprint does not correspond to the user's voice signal, then access is denied at block 314. If, however, the user's voiceprint corresponds to the user's voice signal, then access is granted at block 316. In some embodiments, the challenge-answer process may repeat more than once in accordance with certain prescribed security policies until the user access is granted or denied. The answer validation and voice print verification process can also be performed either sequentially or simultaneously.

In FIG. 4, service program 402 optionally includes a voice verification module 419. Voice verification module 419 includes a speech verifier 420 and a voiceprint database 422. After answer evaluator 414 determines that the answer is a correct answer, the answer is supplied to speech verifier 420. Speech verifier 420 accesses a stored voiceprint from voiceprint database 422 that corresponds to the user's voiceprint. Speech verifier 420 determines if the audible signal of the answer at least substantially corresponds to the user's voiceprint.

In FIG. 5, service program 502 optionally includes a voice verification module 519. Voice verification module 519 includes a speech verifier 520 and a voiceprint database 522. After answer evaluator 514 determines that the answer is a correct answer, the answer is supplied to speech verifier 520. Speech verifier 520 accesses a stored voiceprint from voiceprint database 522 that corresponds to the user's voiceprint. Speech verifier 920 determines if the audible signal of the answer at least substantially corresponds or matches the user's voiceprint.

In FIG. 6, user device 605 optionally includes a voice verification module 619. Voice verification module 619 includes a speech verifier 620 and a voiceprint database 622. After answer evaluator 614 determines that the answer is a correct answer, the answer is supplied to speech verifier 620. Speech verifier 620 accesses a stored voiceprint from voiceprint database 622 that corresponds to the user's voiceprint. Speech verifier 620 determines if the audible signal of the answer at least substantially matches the user's voiceprint.

Although the present invention has been described with reference to particular embodiments, workers skilled in the art will recognize that changes may be made in form and detail without departing from the spirit and scope of the invention.

What is claimed is:

1. A method of authenticating a user, the method comprising:
   storing a collection of personal information in a service program, the collection of personal information having been obtained from the user during service-oriented user interaction with the service program;
   annotating the collection of personal information with semantic data, the semantic data indicating a semantic type for each piece of information in the collection of personal information, the collection of personal information having semantic types that include numeral type data and string type data;
   utilizing an information retriever to access the collection of personal information based at least in part on the annotations;
   performing an authentication operation that is based on the collection of personal information and that incorporates at least one dynamic component, the authentication operation including transmitting a question to the user that is based at least in part on the collection of personal information, the authentication operation configured to prompt the user to give an answer to the question in a form of an audible utterance;
   receiving the audible utterance from the user;
   verifying that the audible utterance is a valid response to the question;
   utilizing a computer processor that is a functional component of a computer to compare the audible utterance to a stored voiceprint; and
   granting the user access to the service program upon the audible utterance being the valid response and upon the audible utterance at least substantially corresponding to the stored voiceprint.

2. The method of claim 1, wherein the collection of personal information includes prior transaction details for the user, and wherein the semantic types also include date type data.

3. The method of claim 1, wherein verifying that the audible utterance is the valid response and comparing the audible utterance to the stored voiceprint are performed simultaneously.

4. The method of claim 1, wherein verifying that the audible utterance is the valid response and comparing the audible utterance to the stored voiceprint are performed sequentially.

5. The method of claim 1, wherein performing an authentication operation that incorporates at least one dynamic component comprises generating a dynamic question that asks about static information from the collection of personal information, and wherein the question is transmitted to the user utilizing an audible speaker.

6. The method of claim 1, further comprising:
   denying the user access to the service program upon either the audible utterance being an invalid response or upon the audible utterance not corresponding to the stored voiceprint; and
   wherein performing an authentication operation that incorporates at least one dynamic component comprises generating a question that requires manipulation of static information.

7. The method of claim 1, further comprising:
   repeating a challenge-answer process more than once before granting the user access; and
   wherein performing an authentication operation that incorporates at least one dynamic component comprises generating a static question that asks about dynamic information from the collection of personal information.

8. The method of claim 1, wherein performing an authentication operation that incorporates at least one dynamic component comprises generating a question that requires identifying an item of information that changes over time, and wherein the audible utterance is decoded utilizing an answer evaluator prior to verifying that the audible utterance is the valid response.

9. The method of claim 1, wherein the audible utterance is transcribed into text utilizing a pronunciation dictionary.

10. The method of claim 1, further comprising denying access to the user if the answer is incorrect before comparing to the stored voiceprint, and wherein the service program is a banking call center that allows the user to access account information and perform financial transactions.

11. The method of claim 1, wherein the service program is an automated credit card service.

12. The method of claim 1, wherein receiving the audible utterance from the user; comprises receiving the audible utterance over a cell phone network, and wherein the service program is an automated cellular phone service.

13. The method of claim 1, wherein receiving the audible utterance from the user comprises receiving the audible utterance over a computer network, and wherein the service program is an automated airline service.

14. A machine-based system for authenticating a user, the system comprising:
an information retriever configured to access a collection of personal information related to a user and annotated with semantic data indicating a semantic type for each piece of information in the collection of personal information, wherein the semantic types include a numeral type and a string type, the collection of personal information being stored in a remotely located user device and including information related to the user's interaction with the remotely located user device, and including information extracted from contacts of the user that are stored in a personal contacts application, the information retriever accessing the collection of personal information based at least in part on the annotations;
an authentication module configured to perform an authentication operation by generating an inquiry based on the accessed collection of personal information from the remotely located user device that incorporates at least one dynamic component, the authentication module including an answer evaluator configured to receive and evaluate the correctness of a response to the inquiry made by the user which is in the form of an audible utterance; and
a voice verification module configured to process the audible utterance received in response to the inquiry to verify that the audible utterance matches the user's stored voiceprint.

15. The machine-based system of claim 14, wherein the user's contacts include people to whom the user has sent email and people from whom the user has received email.

16. The machine-based system of claim 14, wherein the collection of personal information includes information extracted from documents the user has created, from documents the user has sent, and from documents the user has received.

17. The machine-based system of claim 14, wherein the collection of personal information includes information about tasks the user has completed on a user device.

18. The machine-based system of claim 17, wherein the tasks include a last music file downloaded and a last music file burned to a disc.

19. The machine-based system of claim 14, wherein the authentication module comprises a question generator that generates a dynamic question that asks about the collection of personal information, and wherein the collection of personal information includes an identity of whom the user last sent an email to.

20. The machine-based system of claim 14, wherein the authentication module comprises a question generator that generates a question that requires manipulation of the collection of personal information, and wherein the collection of personal information includes an identity of whom the user last received an email from.

21. The machine based system of claim 14, wherein the authentication module comprises a question generator that generates a static question that asks about dynamic information from the collection of personal information, and wherein the collection of personal information includes an identity of whom the user last received an instant message from and an identity of whom the user last sent an instant message to.

22. The machine based system of claim 14, wherein the authentication module comprises a question generator configured to generate a question that requires identifying an item of information that changes over time, wherein the collection of personal information is extracted by an operating system, and wherein the operating system makes the collection of personal information available to the information retriever.

23. The machine-based system of claim 14, wherein the voice verification module further comprises a voiceprint database, the speech verifier configured to access the voiceprint from the voiceprint database, and wherein the user is authenticated to the system such that the user is able to access a digital signature when transmitting email or data over a network.

24. The machine-based system of claim 14, further comprising a speech recognition system for recognizing the audible utterance, the speech recognition system transcribing the audible utterance into text utilizing a pronunciation dictionary.

25. A computer implemented method for authenticating a user, the method comprising:
accessing a collection of personal information related to the user;
annotating the personal information with semantic types, the semantic types
including numeral type data, date type data, and string type data;
mining the personal information utilizing a data retriever, the data retriever mining the personal information based upon the semantic types;
utilizing a computer processor that is a functional component of a computer to generate a question that incorporates a dynamic component, the dynamic component requiring the user to complete one of a plurality of mathematical operations, the plurality of mathematical operations including addition, subtraction, and multiplication;
capturing an audible answer to the question; and
comparing the audible answer to a stored voiceprint.

26. The computer-implemented method of claim 25, wherein the collection of personal information is accessed by way of a computer network, wherein the collection of personal information includes contact names, and wherein the contact names are annotated as being string type data.

27. The computer-implemented method of claim 25, wherein the collection of personal information includes information related to the user that is obtained during a user initiation of a user device.

28. The computer-implemented method of claim 25, wherein generating a question comprises generating a question that, requires manipulation of static information from the collection of personal information, and wherein the information related to the user includes a social security number and a birth date.

29. The computer-implemented method of claim 25, wherein generating a question comprises generating a question that requires identifying an item of information that changes over time, the item of information coming from a document that the user has created, sent, or received.

30. The computer-implemented method of claim 25, further comprising recognizing the audible answer with a speech recognizing system after the audible answer is captured, and wherein the dynamic component comprises requiring a manipulation of the collection of personal information.

31. The computer-implemented method of claim 30, further comprising evaluating the audible answer for correctness after the audible answer is recognized, and wherein the required manipulation is a summation of multiple numbers.

32. The computer-implemented method of claim 31, further comprising denying access to the user before comparing the audible answer to the stored voiceprint if the audible answer is incorrect, and wherein the multiple numbers are chosen randomly.

33. The computer-implemented method of claim 31, further comprising granting access to the user if the audible answer is correct and the audible answer at least substantially corresponds to the stored voiceprint, and wherein the multiple numbers are selected from a social security number.

34. A method of authenticating a user, the method comprising:
storing personal information in a service program, the personal information annotated with semantic data indicating a semantic type for each piece of information in the collection of personal information, wherein the semantic types include a numeral type and a string type, and including static information and having been obtained from the user during an enrollment process;
transmitting a request for authentication to the user incorporating a dynamic component, the dynamic component in a form of a dynamic question, the dynamic question based on static information and unpredictably generated from one authentication attempt to the next, the request prompting the user to functionally manipulate an element of personal information, the functional manipulation including manipulating only an element of alphabetical information from the personal information;
receiving the authentication information from the user as an audible utterance;
utilizing a computer processor that is a functional component of a computer to evaluate for correctness the audible utterance against the personal information accessed at least in part based on the annotations;
comparing the audible utterance to a stored voiceprint of the user; and
wherein if the authentication information received in the form of the audible utterance fails to correctly identify the personal information then access is denied to the user before the audible utterance is compared to the stored voiceprint of the user.

35. The method of claim 34, wherein functionally manipulating the element of personal information comprises selecting a portion of letters in a word.

36. The method of claim 34, wherein functionally manipulating the element of personal information comprises reversing an order of letters in a word.

37. A method of authenticating a user, the method comprising:
accessing a collection of personal information related to a user and annotated with semantic data indicating a semantic type for each piece of information in the collection of personal information, wherein the semantic types include a numeral type and a string type;
transmitting a request for authentication information to the user;
receiving the authentication information from the user as an audible utterance;
evaluating the authentication information against personal information accessed from a remotely located user device based at least in part on the annotations;
utilizing a computer processor that is a functional component of a computer to compare the audible utterance to a stored voiceprint of the user; and
upon the audible utterance substantially matching the personal information accessed from the remotely located user device and stored voiceprint, providing the user with access to a digital signature for transmitting data over a network.

38. The method of claim 37, wherein the personal information is stored in the user device and the static question does not require manipulation of the continuously changing information, and wherein the user device is a cell phone.

* * * * *